Patented Sept. 18, 1951

2,567,987

UNITED STATES PATENT OFFICE 2,567,987

HERBICIDAL COMPOSITIONS

Luther L. Baumgartner, Hastings on Hudson, N. Y., assignor to The B. F. Goodrich Company, New York, N. Y., a corporation of New York No Drawing. Application December 10, 1948, Serial No. 64,710

6 Claims. (Cl. 71—2.3)

This invention relates to herbicidal compositions and more specifically pertains to heribicidal compositions containing a chlorophenyl alkyl or alkenyl carbonate as the toxic ingredient, together with a mineral oil as carrier, and to the use of such compositions in killing weeds, and undesirable grasses and in various other herbicidal applications.

I have discovered that when a chlorophenyl carbonate having the formula:

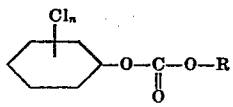

where $n$ is an integer from one to five, preferably from 2 to 5, and where R is a hydrocarbon radical selected from the alkyl and alkenyl groups, is mixed with a mineral oil consisting predominantly of hydrocarbons containing from 10 to 20 carbon atoms such as kerosene and fuel oils, in concentrations as low as about 0.1% by weight, the resulting compositions are exceedingly effective herbicides, being useful in killing a wide variety of weeds and grasses including varieties which are not controlled effectively with known herbicides.

These chlorophenyl carbonates can be prepared by the well known reactions employing phosgene and alcohols. For example, by reacting one mole of ethyl alcohol with one mole of phosgene there is formed ethyl chlorocarbonate (ethyl chloroformate) and hydrogen chloride according to the following reaction:

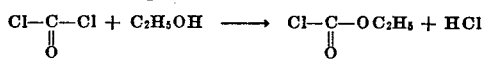

The ethyl chlorocarbonate is then reacted with a chlorophenol to produce the desired chlorophenyl ethyl carbonate and hydrogen chloride according to the following reaction:

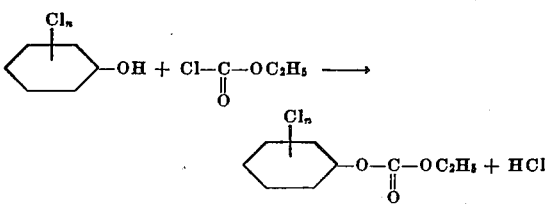

where $n$ is an integer from one to five. In place of ethyl alcohol, other alkyl and alkenyl alcohols may be employed to produce the corresponding alkyl and alkenyl chlorophenyl carbonates. Moreover, in the second reaction, any mono-, di-, tri-, tetra-, or penta-chlorophenol may be employed as well as the mixture of chlorinated phenols which results from the chlorination of phenol. Hereinafter, for convenience, the product of the reaction of an alkyl or alkylene chlorocarbonate with a mixture of the various chlorophenols will be referred to as mixed-chlorophenyl alkyl or alkenyl carbonates.

The alkyl and alkenyl chlorophenyl carbonates which can be employed to prepare the compositions of this invention include, for example, methyl, ethyl, propyl, isopropyl, butyl, allyl, methallyl, and butenyl mono-, di-, tri-, tetra-, and pentachlorophenyl carbonates. Of these, polychlorophenyl allyl carbonates and polychlorophenyl ethyl carbonates, are preferred for the preparation of the herbicidal compositions of this invention.

The mineral oil used as the carrier in the herbicidal compositions described herein may be any oil consisting predominantly of hydrocarbons preferably paraffin hydrocarbons containing from 10 to 20 carbon atoms. Such hydrocarbons generally possess a boiling point about 150° C. and a Saybolt viscosity below 200 seconds. Examples of such oils are kerosene, diesel fuel oils, bunker C fuel oil, and other similar hydrocarbon mixtures whether or not derived from petroleum. In general, the lighter petroleum fractions and especially kerosene are preferably employed in preparing spray compositions for use in temperate climates while the heavier higher molecular weight petroleum oils such as the diesel fuel oils are best suited for formulations to be used in the hotter climates.

Compositions consisting entirely of the chlorophenyl carbonate in a concentration between 0.1 and 10% by weight dissolved in the carrier oil may be sprayed on plants to produce the herbicidal effect. If desired, however, the chlorophenyl carbonate dissolved in the oil may be emulsified in water with the aid of a wetting or dispersing agent to produce an oil-in-water emulsion containing from 0.1 to 10% by weight of the chlorophenyl carbonate and an oil content from 1 to 100% of that of the water, and the resulting emulsion sprayed on plant life. In either event I have found that the application of the compositions in amounts such as to provide as little as 1 to 10 lbs. of the chlorophenyl carbonate per acre of sprayed area is sufficient to kill a variety of undesirable weeds and grasses although, of course, higher rates of application up to 50 lbs. of chlorophenyl carbonate per acre may be employed in some instances.

The wetting or dispersing agents which can be used in preparing the oil-in-water emulsions include those typified by the following general classifications: sodium and potassium salts of fatty acids known as soft and hard soaps; fatty acids saponified with amines and amino alcohols; water-soluble salts of disproportionated abietic acid known as rosin soaps; water-soluble salts of the hydroxy aldehyde acids present in seaweeds known as Algin soaps; water-soluble alkali-casein compositions; water-soluble lignin sulfonate salts; water-soluble long-chain alcohols usually containing 10 to 18 carbon atoms; water-soluble salts of fatty acid amides; water-soluble salts of sulfated fatty acid esters; water-soluble alkyl sulfonates containing 8 to 20 carbon atoms in the alkyl group; water-soluble aryl sulfonates; water-soluble alkyl aryl sulfonates; water-soluble aralkyl sulfonates; water-soluble sorbitan mono-laurates, -palmitates, -stearates, and -oleates; quaternary alkyl halides; fatty poly ethers; and others. These wetting or dispersing agents are sold under numerous trade names and may be either pure compounds or mixtures of compounds of the same general group.

In general such wetting or dispersing agents are employed in concentrations of from about 0.1% by weight to about 5% by weight based on the total weight of the composition prepared. The amount employed will vary not only with the quantity of oil to be emulsified but will vary with the efficiency of each dispersing agent to form a suitable stable oil-in-water emulsion.

When the herbicidal compositions of this invention are applied to plants, their toxic activity is manifest by different outward signs depending on the particular variety of plant. For example, plants with apical meristems such as stinging nettle (*Urtica dioios*) cease growing after application of the composition but as much as a week may elapse before the plants are completely dead. Plants of the lily family, as exemplified by the common onion, exhibit no external symptoms of the action of the herbicide until the bulb is well rotted. Carrots and burdock react to these herbicides by developing acute necrosis at the juncture of leaves and root stock before the plant is dead.

The following specific examples which appear in tabulated form illustrate the wide utility of the herbicidal compositions with which this invention is concerned. In each example a composition of the nature shown was sprayed on an agricultural plot in which was growing the plants indicated. Where no rate of application is given the compositions were applied to the plants as a fine mist spray until the leaves of the plants were wetted with the spray composition. All sprayed plants were killed by the application unless otherwise indicated.

TABLE I

*Ethyl chlorophenyl carbonates*

| Example | Ethyl Carbonate Employed | Concentration, parts by weight | Carrier, parts by weight | Plants Treated and Killed |
|---|---|---|---|---|
| 1 | 2,4-dichlorophenyl | 1.0 | 100-kerosene | Large mature burdock. |
| 2 | 2,4,6-trichlorophenyl | 1.0 | do | bean, tomato, radish, buckwheat. |
| 3 | Pentachlorophenyl | 0.5 | do | tomato, tobacco, bean. |
| 4 | Mixed-chlorophenyl | 1.0 | oil-in-water emulsion {50.0 water, 50.0 kerosene, 1.0 Triton N-100 [1]} | Crabgrass. |
| 5 | Mixed-chlorophenyl | 1.0 | oil-in-water emulsion {20-kerosene, 80-water, 1.0-Igepal 300 [1]} | dandelion. crabgrass. |
| 6 | Mixed-chlorophenyl | 1.0 | 100-kerosene | Japanese Honeysuckle. |
| 7 | Mixed-chlorophenyl | 2.0 | do | 90% of all weeds in a weed plot killed. |
| 8 | Pentachlorophenyl, applied at 4.0 lbs. toxicant per acre. | 4.0 | oil-in-water emulsion {400-water, 320-kerosene, 8.0-Triton N-100} | dock, burr week, Dallas grass, carpet grass sedge. |

[1] Triton N-100—Tertiary octyl phenoxy polyether alcohol emulsifier. Igepal 300—Fatty polyether emulsifier.

TABLE II

*Allyl chlorophenyl carbonates*

| Example | Allyl Carbonate Employed | Concentration, parts by weight | Carrier, parts by weight | Plants Treated and Killed |
|---|---|---|---|---|
| 9 | 2,4,6-trichlorophenyl | 1.0 | 100-kerosene | bean, tomato, radish, buckwheat. |
| 10 | 2,4,5-trichlorophenyl | 0.25 | do | radish, bean, tomato. |
| 11 | Pentachlorophenyl | 0.25 | do | radish, bean, and tomato. |
| 12 | Pentachlorophenyl | 1.0 | do | ragweed. |
| 13 | Pentachlorophenyl | 0.5 | do | crabgrass. |
| 14 | O-Chlorophenyl | 0.05 | do | Do. |
| 15 | 2,4,5-trichloro-phenyl applied at 10 lbs. of toxicant per acre. | 10.0 | 670-kerosene | dock, Dallas grass, carpet grass, burr weed, spur grass. |
| 16 | 2,4,5-trichloro-phenyl applied at 5 lbs. of toxicant per acre. | 5.0 | 440-kerosene | dock, dandelion, golden rod. |
| 17 | Pentachlorophenyl applied at 1.0 lb. per acre. | 1.0 | do | complete kill of mixed weeds and grasses including Johnson grass, pepperweed and dandelion. |
| 18 | 2,4,6-trichlorophenyl | 10 | 335-kerosene | 80% of treated wild onions killed. |
| 19 | do | 5 | do | 95% of treated wild onions killed. |
| 20 | pentachlorophenyl | 5 | do | Do. |
| 21 | mixed-chlorophenyl | 0.05 | 100-kerosene | crabgrass. |
| 22 | mixed-chlorophenyl applied at 1.0 lb. per acre. | 1.0 | oil-in-water emulsion {50-kerosene, 50-water, 1.0 Triton N-100} | crabgrass, rye, dock. |
| 23 | do | 1.0 | oil-in-water emulsion {20-kerosene, 80-water, 1.0 Triton N-100} | dandelion, ragweed, Spanish nettle. |
| 24 | mixed-chlorophenyl | 1.0 | 100-kerosene | orchard grass, mustard, Japanese Honeysuckle, wild carrot, galinsoga, crabgrass, wild lettuce, sheep's sorrel, wild radish. |
| 25 | do | 0.5 | do | burdock, portulaca, lamb's quarter. |
| 26 | do | 0.25 | do | milkweed, orchard grass, evening primrose, lamb's quarter, portulaca, wild lettuce. |
| 27 | do | 1.5 | do | pokeweed, thistle. |

Triton N-100 = Tertiary octyl phenoxy polyether alcohol emulsifier.

Control tests were also carried out by spraying weed plants in the same plots with kerosene containing no toxicant. In general it was found that the application of kerosene at the same rate used in the herbicidal trials had little or no effect on the plants treated.

In addition to the compositions employed in the tests of Table I and Table II mixed-chlorophenyl isopropyl carbonates were also employed to prepare herbicidal compositions. The following is an example of the toxicity of such compositions. Large mature burdock plants were sprayed with a kerosene solution containing 1% by weight of mixed-chlorophenyl isopropyl carbonate. After a few days all of the burdock plants so treated were dead. An oil-in-water emulsion containing mixed chlorophenyl isopropyl carbonates was prepared by emulsifying 20 parts by weight of the 1% carbonate solution in this solution in 80 parts by weight of water in which was dissolved 0.5% by weight of dilauryldimethyl ammonium bromide as an emulsifying agent. This composition was sprayed on bluegrass. After 7 days all of the bluegrass so sprayed was dead.

The compositions employed in the tests of Table I and Table II as well as the above compositions containing mixed-chlorophenyl isopropyl carbonate are effective killers not only of the weeds and grasses listed but also are effective against wheat, corn, timothy, barnyard grass, Johnson grass, yellow fox tail and cattail as well as other similar plant species. Many of the plants effectively killed with these compositions cannot be controlled with other known herbicides.

In general, the concentration of the toxic ingredient necessary for satisfactory herbicidal activity will vary with air temperature as is the case in the use of other herbicides such as 2,4-dichlorophenoxy acetic acid (2,4D) and its salts and esters. For example, where the use of a composition containing a concentration of 0.1% to 0.5% of the toxicant is satisfactory to obtain good kill of one or several species during hot weather, compositions containing 1% to 5% of the toxicant may be required during cool to cold weather to accomplish the same results.

While I have herein disclosed various embodiments of the invention, it will be understood that I do not intend that the invention be thereby limited, but only as required by the spirit and scope of the appended claims.

I claim:

1. A herbicidal composition comprising as an essential active ingredient 0.1% to 10% by weight of pentachlorophenyl allyl carbonate and, as a carrier therefor, a mineral oil consisting predominately of hydrocarbons containing 10 to 20 carbon atoms.

2. A herbicidal composition comprising as an essential active ingredient 0.1% to 10% by weight of pentachlorophenyl ethyl carbonate and, as a carrier therefor, a mineral oil consisting predominately of hydrocarbons containing 10 to 20 carbon atoms.

3. A herbicidal composition comprising as an essential active ingredient 0.1% to 10% by weight of pentachlorophenyl allyl carbonate and, as a carrier therefor, a mineral oil consisting predominately of hydrocarbons containing 10 to 20 carbon atoms, water and a surface-active agent.

4. A herbicidal composition comprising as an essential active ingredient 0.1% to 10% by weight of pentachlorophenyl ethyl carbonate and, as a carrier therefor, a mineral oil consisting predominately of hydrocarbons containing 10 to 20 carbon atoms, water and a surface-active agent.

5. A herbicidal composition comprising as an essential active ingredient 0.1 to 10% by weight of an active herbicidal ingredient selected from the class consisting of alkyl and alkenyl pentachlorophenyl carbonates, and, as a carrier therefor, a mineral oil consisting predominately of hydrocarbons containing 10 to 20 carbon atoms.

6. A herbicidal composition comprising as an essential active herbicidal ingredient 0.1 to 10% by weight of an active herbicide ingredient selected from the class consisting of alkyl and alkenyl phentachlorophenyl carbonates, and, as a carrier therefor, a mineral oil consisting predominately of hydrocarbons containing 10 to 20 carbon atoms, water and a surface-active agent.

LUTHER L. BAUMGARTNER.

REFERENCES CITED

The following references are of record in the file of this patent:

UNITED STATES PATENTS

| Number | Name | Date |
|---|---|---|
| 2,396,513 | Jones | Mar. 12, 1946 |

OTHER REFERENCES

Chemical Abstracts, June 20, 1947, columns 3902 to 3910.

Science, Jan. 16, 1948, page 66.

Science News Letter, Aug. 2, 1947, page 66.

"Oil Sprays for Weeding Carrots," N. Y. State College of Agriculture, Bull. V-33, April 1945, Revised Feb. 1948, 5 pages.